Feb. 7, 1939.   A. T. McWANE   2,146,641
PIPE JOINT
Filed Oct. 30, 1937   2 Sheets-Sheet 1
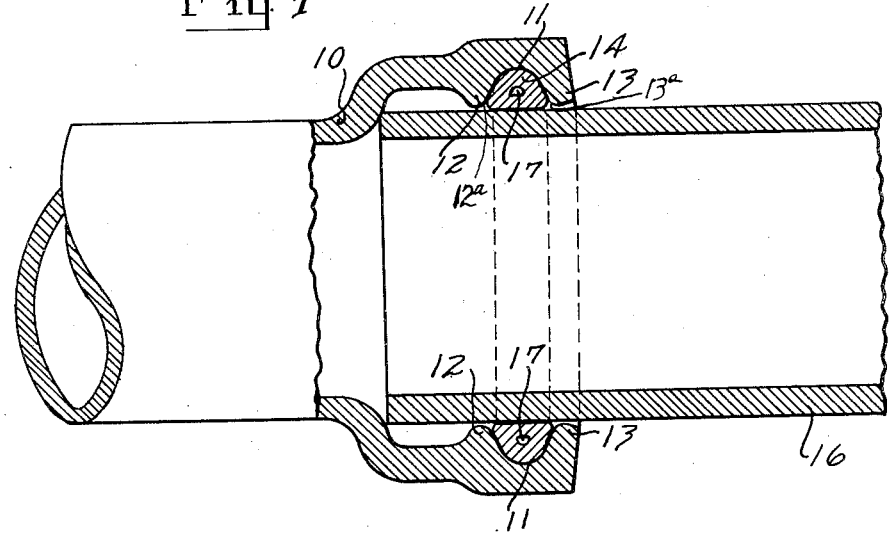
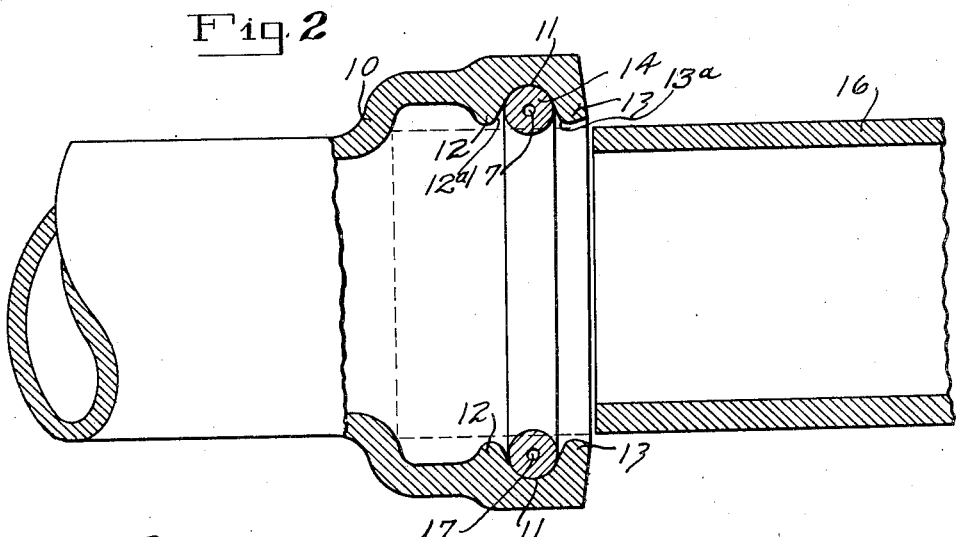
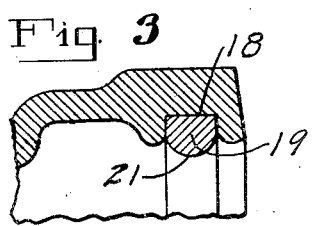
Inventor
ARTHUR T. McWANE
By Johnston & Jennings
Attorneys Feb. 7, 1939.  A. T. McWANE  2,146,641
PIPE JOINT
Filed Oct. 30, 1937  2 Sheets-Sheet 2
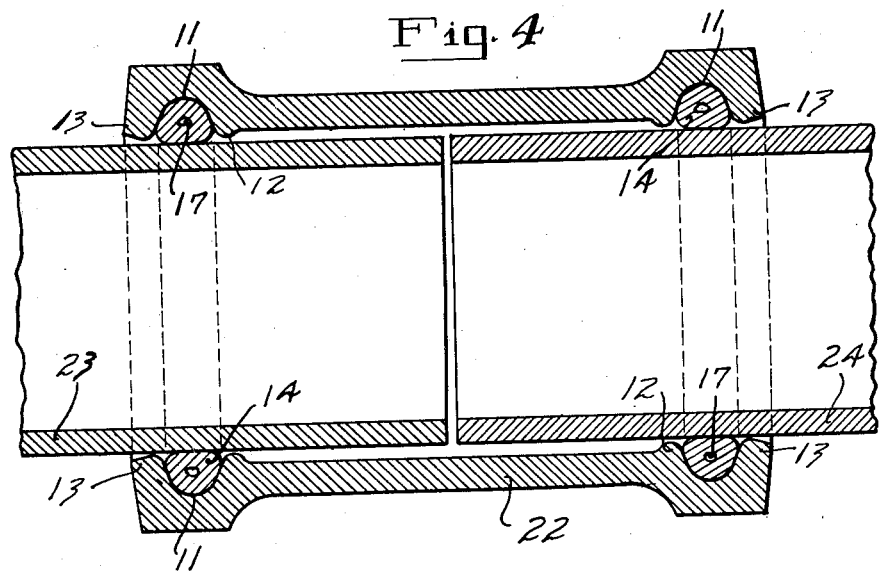
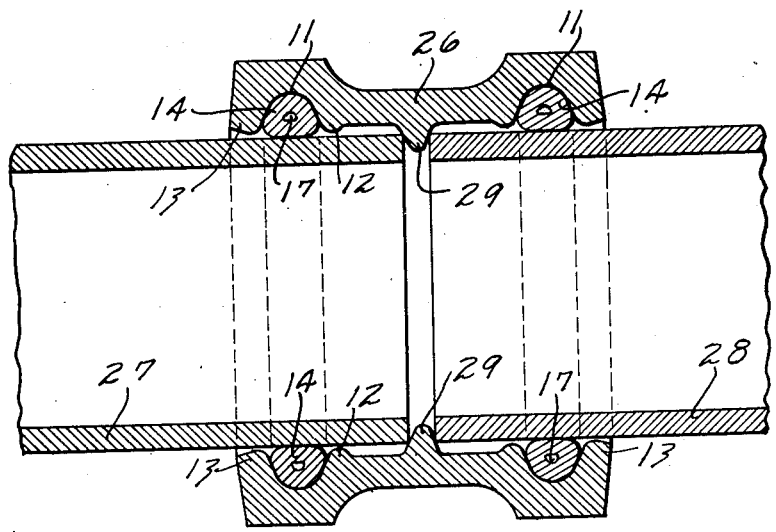
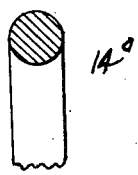
Inventor
ARTHUR T. McWANE
By Johnston & Jennings
Attorneys Patented Feb. 7, 1939

2,146,641

UNITED STATES PATENT OFFICE 2,146,641

PIPE JOINT

Arthur T. McWane, Birmingham, Ala.

Application October 30, 1937, Serial No. 171,878

1 Claim. (Cl. 285—163)

This invention relates to packing joints for metal pipe and fittings, as well as pipe and fittings made of any suitable materials having bell and spigot ends, and has for an object the provision of a device of the character designated which shall be simple and economical, easy to apply, and which shall be capable of withstanding pressures without leakage, varying from subatmospheric to the highest practicable working pressures.

A further object of my invention is to provide a packing joint for bell and spigot pipe comprising a rubber gasket which shall be substantially completely confined by surrounding walls in the bell, cast integrally with the pipe, and the spigot end of the connecting pipe so as to be under a maximum of compression and to withstand a maximum of pressure.

A still further object of my invention is to provide a packing joint for bell and spigot pipe comprising a rubber gasket seated within and confined by a relatively deep groove cast in the bell end of the pipe and being distorted by, and bearing against the spigot end of the connecting pipe.

As is well known in the art to which my invention relates, difficulties have been encountered in providing a simple economical packing joint for bell and spigot pipe which would withstand any considerable pressure, and which would not impart rigidity to the line in which it was employed. The joint most commonly employed for moderate pressures, such as found in city water mains, has been the lead caulked joint, the same being a combination of jute or other fibrous material and lead, caulked or driven tight into the joint after it was laid. Where higher pressures were employed, it has been customary to resort to a bolted, or gland type, joint. The lead caulked joint, while relatively inexpensive in first cost, involves considerable semi-skilled labor to install; while the bolted, or gland type of joint, is more expensive in first cost and also involves considerable semi-skilled labor to install.

It is accordingly the principal object of my invention to provide a packing joint for bell and spigot pipe which shall withstand pressures comparable to those which a bolted or gland type joint will withstand, which shall be more economical to manufacture, and which may be installed with unskilled labor in less time than has heretofore been necessary with other types of joint.

Rubber gaskets for bell and spigot joints have heretofore been proposed and employed in various ways, but so far as I am aware, the compression of the gasket whereby it would withstand pressure has been accomplished in one type by tamping a caulking metal or fibrous packing behind and in front of the gasket. Such a joint has been capable of withstanding only such pressures as the caulking metal or fiber would stand. Rubber gaskets are also usually employed in a gland type joint. It has also been proposed to employ thin walled hollow rubber gaskets filled with air or a liquid under pressure with means to increase the pressure of the fluid within the hollow gasket.

In accordance with my invention, I employ an annular rubber gasket which is preferably circular in transverse cross section, and which fits snugly into a semi-cylindrical groove in the bell end of the pipe. The gasket is slightly less in internal diameter than the outer diameter of the cooperating spigot end of the pipe, which latter has a clearance with respect to the bell end of the pipe at the groove just sufficient to permit ready insertion of the spigot end. The gasket is thus stretched around the spigot end of the pipe and pressed into the groove in the bell end of the pipe. It is also necessarily distorted out of its round cross section and, being confined as to flow, is under heavy pressure in all directions. Inasmuch as rubber is only slightly compressible, I round off, or flare the sides of the gasket groove adjacent the spigot end of the pipe to provide room for the rubber to flow when compressed in the groove by the insertion of the spigot end of the pipe. Joints so formed, and without any other packing means, have stood water pressures up to 1900 pounds per square inch without leaking.

Apparatus embodying features of my invention is illustrated in the accompanying drawings forming a part of this application, in which—

Fig. 1 is a sectional view of a pipe joint made in accordance with my invention;

Fig. 2 is a view of the parts shown in Fig. 1, disassembled;

Fig. 3 is a fragmentary view showing a gasket and groove of different form;

Fig. 4 is a cross sectional view showing my invention as embodied in a repair sleeve;

Fig. 5 is a view similar to Fig. 4, showing my invention embodied in a coupling; and Fig. 6 is a view of a modified form of a gasket.

In Figs. 1 and 2 the bell end of the pipe is shown at 10 formed with a deep seated annular groove 11 having side walls 12 and 13. For economy of manufacture, the bottom of the groove 11 is preferably made circular to accommodate a gasket 14 which is circular in cross section and which fits snugly within the groove. The spigot end 16 of the cooperating pipe is somewhat greater in diameter than the inner diameter of the gasket 14 and has relatively close clearance with the side walls 12 and 13 of the groove 11. Inasmuch as rubber is only slightly compressible, I round off or flare the side walls 12 and 13, as shown at 12a and 13a, so as to widen the groove 11 adjacent the spigot end 16 of the cooperating pipe to provide room for the rubber of the gasket 14 to flow when put under pressure by the insertion of the spigot end 16. In assembling the joint, the gasket 14 is placed in the groove 11, as shown in Fig. 2, and the spigot 16 is then forced through the gasket into the bell end. As seen in the drawings, the gasket 14 is thus distorted into a somewhat triangular cross section and is pressed tightly into the groove 11 and against the spigot end of the pipe 16. The force required with pipe up to eight inches in diameter need be no greater than the physical force of the men handling the pipe, without the aid of harness. The relation of the diameter of the spigot 16 to the inside diameter of the gasket 14 is such that the gasket is forced into tight contact with the walls of the groove 11 and is distorted, as shown in Fig. 1, in somewhat exaggerated form so that it grips tightly the surface of the spigot end of the pipe. When under pressure, the pressure within the pipe acting on the inner wall of the gasket tends to compress it further so as to force it into still tighter engagement with the surface of the spigot end of the pipe and bell groove.

The clearance between the spigot end of the pipe and the walls of the groove 11 is only such as to permit easy insertion of the spigot end of the pipe, allowing for reasonable deflection, and is sufficiently close that the rubber in the gasket 14 will not flow out between the lip of the bell and the surface of the spigot due to pressures within the pipe. While a solid gasket, such as 14a, shown in Fig. 6, may be employed, the gasket is preferably made hollow to permit of easier distortion when the spigot is entered. The hollow 17, as shown in the various figures of the drawings, should be less than the thickness of the surrounding rubber, or else I have found the gasket liable to collapse and leak under high pressures.

While the form of bell shown in Figs. 1 and 2 is the most easily cast, it will be obvious that the objects of the invention may be obtained by a groove and corresponding gasket of a different shape. For example, I show in Fig. 3 a groove 18 which is rectangular in cross section and which is provided with a gasket 19 shaped to bottom within the groove 18 and having an inner rounded surface 21 to cooperate with the spigot end of the pipe and be distorted as described in connection with the other gasket when the spigot is entered.

It will also be obvious that the invention is not limited literally to bell and spigot type of pipe joints, and it is to be understood that wherever in this specification and in the accompanying claim a "bell and spigot" type of joint is mentioned, that term is intended to cover analogous types of joints. For example, I show in Fig. 4 a sleeve 22 having grooves 11 in each end thereof, in which are located gaskets 14, and which cooperate with opposed smooth ended pipes 23 and 24. This type of sleeve is adapted for repair work, and in assembling, the sleeve 22 has its gaskets placed therein and is then slipped over one of the pipes, for example, 23. The pipe 23 is then placed in alignment with the pipe 24 and the sleeve moved to the position shown in Fig. 4 of the drawings when the assembly is complete.

In Fig. 5 I show a coupling member 26 having grooves 11 in each end thereof with gaskets 14 in the grooves, and which cooperate with the opposed smooth pipe ends 27 and 28. This coupling 26 is provided with an inner rib 29 which prevents its shifting from its proper position with respect to the pipe ends 27 and 28, and it is accordingly preferably used on new work.

While various dimensions of joint elements might obviously be successfully employed, in order that others may practice my invention without the necessity of resorting to prolonged experiment, I will now state, by way of example, the dimensions I have found suitable. I have formed joints capable of withstanding the bursting pressure of cast iron pipe up to eight inches diameter, employing gaskets of approximately .80 inch in cross sectional diameter. Where hollow gaskets were employed, the hole 17 should not be greater in diameter than the thickness of the surrounding wall. With gaskets .80 inch in cross sectional diameter, it is preferably not more than one-fourth inch in diameter and preferably is less, being only enough to permit the insertion of the spigot end of the pipe without the exertion of undue force. The gasket 14 is made of a grade of rubber having sufficient elasticity to permit its distortion, as shown and described, and sufficient strength and density to prevent its flow under high pressure. The grade of rubber usually employed in gland type joints with which the art is well acquainted is the grade which I have successfully employed with these gaskets. With a gasket such as described mounted in accordance with my invention, I have found that the outer diameter of the spigot end of the pipe should be from .125 to .25 inch greater than the inner diameter of the gasket before the spigot is inserted. The clearance between the outer surface of the spigot and the inner surface of the annular walls 12 and 13 of the groove 11 was usually around one-eighth of an inch.

The remarkable packing effect is apparently produced by the compressive force of the walls of the groove 11 on the gasket and the resistance to flow of the rubber in the gasket which causes it to engage the surface of the spigot and the walls of the groove with extremely high unit pressure. Also, when the pressure within the pipe, after assembly, acts against the inner surface of the gasket, it forces the gasket into tighter engagement with the groove and the spigot.

This joint, as designed, has great laying flexibility, inasmuch as a length of pipe can be cut anywhere to suit conditions without requiring another pipe joint to be cast with appropriate ends; that is, cutting off a piece of pipe still leaves a plain end to enter the bell of an adjacent pipe.

It is well known in the art that numerous rubber substitutes have been produced having the same or improved properties as rubber with respect to elasticity, stretch, flow and density. It will be understood that the term "rubber" as used in this specification and in the claim, is intended to cover such substitutes having properties adapting them to the uses herein described. It will also be understood that the gaskets may be wholly or partially coated, covered or impregnated with protective substances such as jute, duck, asbestos, or metal, as is the practice with other rubber gaskets employed in this art.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claim.

What I claim is:

A packing joint for bell and spigot pipe and fittings comprising a relatively smooth surfaced spigot member, a bell member having clearance with respect to the spigot member just sufficient to permit ready insertion of the spigot member, and having an arcuate gasket groove therein with its sides flared at the surface of the bell to widen the groove, and an annular rubber gasket circular in transverse cross section seated snugly in the groove and adapted to surround the spigot, said gasket being normally smaller in internal diameter than the outer diameter of the spigot the relative sizes of the groove, gasket and spigot being such that sufficient pressure is applied to the gasket by mere insertion of the spigot to cause it to substantially fill the flared portion of said groove whereby the surface area of engagement with the spigot is materially enlarged.

ARTHUR T. McWANE.